Patented Aug. 16, 1932

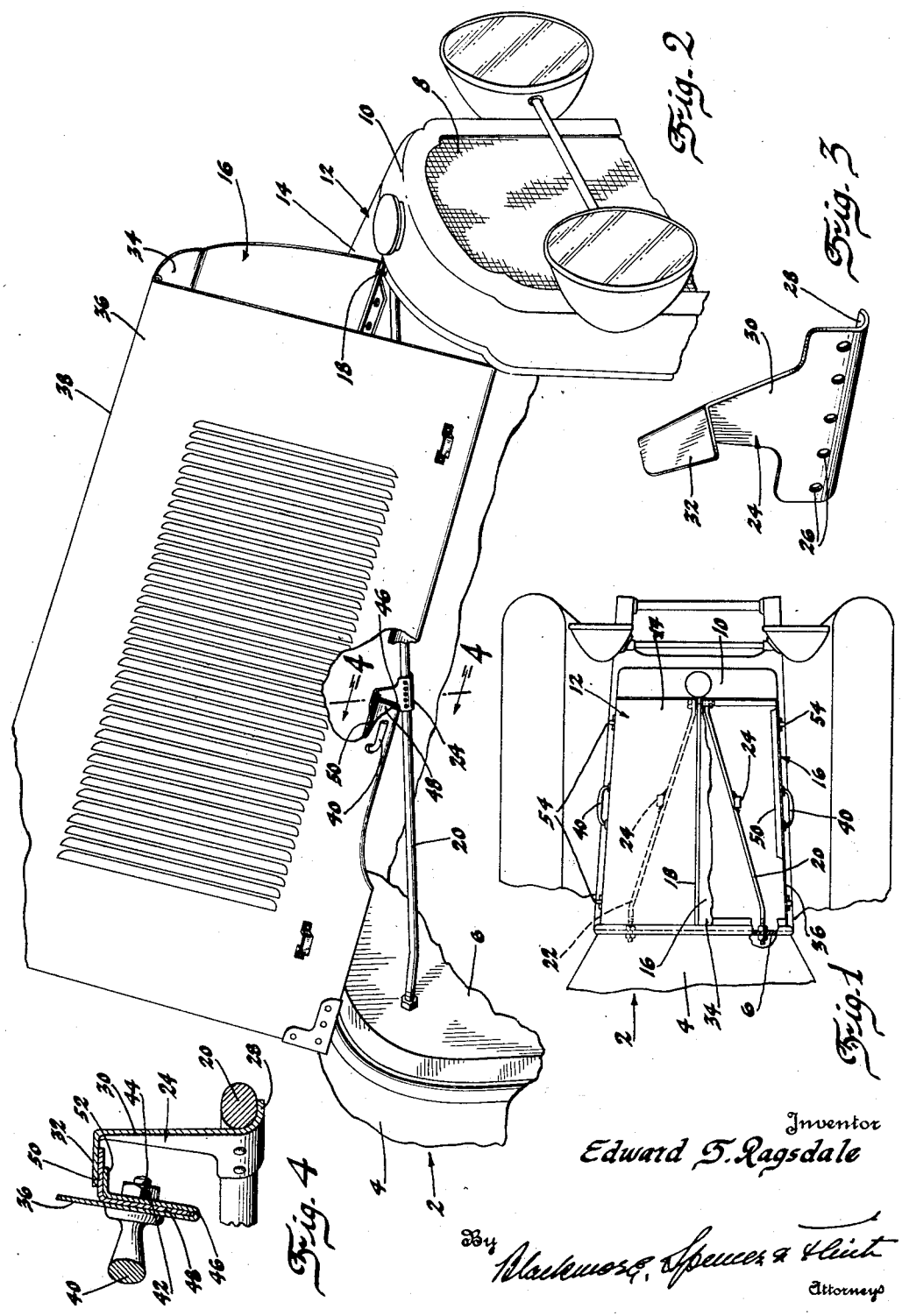

1,872,184

UNITED STATES PATENT OFFICE

EDWARD T. RAGSDALE, OF FLINT, MICHIGAN, ASSIGNOR TO GENERAL MOTORS CORPORATION, OF DETROIT, MICHIGAN, A CORPORATION OF DELAWARE

HOOD CATCH

Application filed April 13, 1931. Serial No. 529,637.

This invention relates to the hoods of vehicles and has particular reference to a catch for holding the hood in raised position.

In modern automotive vehicle practice, the hoods are hinged on a line between the top of the radiator shell and the center of the cowl. Each hinged portion is in turn provided with two or more hinged sections to permit the hood to be raised and folded to allow the inspection of the engine. When an inspection of the engine is necessary, it has been customary to raise the hood and fold it back on the unraised hood section. This has been objectionable for the reason that the edge of the hood rested on the cowl or radiator shell and tended to mar the surface of the vehicle by scratching or wear and it was also somewhat inconvenient to pull back the hood portion and return it to down position. It is the object of the present invention to retain the hood in raised position but keep it from resting on other portions of the vehicle. In its raised position, the center of gravity of the raised hood section will be on one side of the hinge and over the unraised portion of the hood. This position of the center of gravity will tend to further swing the raised hood section to collapsed position but further movement will be prevented by the structure of the invention.

The structure of the invention embodies a bracket which is secured to the brace rod between the dashboard and the radiator shell. In modern practice, two brace rods are used which are in the form of a V diverging toward the dash. One bracket is attached to each brace rod and each bracket is provided with an angularly extended end adapted to engage a flange on the interior of each hood section.

On the drawing:

Figure 1 is a plan view of the invention with parts broken away for purposes of clearer illustration.

Figure 2 is a perspective view of the invention with the hood in raised position.

Figure 3 is a perspective view of the bracket.

Figure 4 is a section on the line 4—4 of Figure 2.

Referring to the drawing, the numeral 2 indicates the vehicle as a whole. The vehicle has the cowl 4, dashboard 6, radiator 8, radiator shell 10 and the hood 12. The hood comprises the two lateral sections 14 and 16 hinged at 18 on a line extending centrally of the vehicle and between the top of the shell and the cowl 4. Brace rods 20 and 22 extend from the dashboard 6 to the upper portion of the radiator shell 10 and brace the radiator and dashboard. As is best shown in Figure 1, these brace rods 20 and 22 diverge from the radiator shell to the dashboard. The parts so far described are conventional.

The invention consists in the application of brackets 24 to the rods 20 and 22, one bracket being secured to each rod. The brackets are provided with the openings 26 which mate with corresponding openings in the rods 20 and 22 and bolts or rivets may be passed through the openings to secure the brackets in place. The lower portion of the brackets is preferably curved as shown at 28 to conform to the curvature of the rods 20. Each bracket has the upstanding shank portion 30 and an angularly bent portion 32 at its end.

Each hood section 14 and 16 is divided into two subsections 34 and 36 hinged together along the line 38. At the bottom of the section 36, the usual handle 40 is provided and is secured in place by means of the nuts 42 threaded onto the shanks 44. The lower edge of the section 36 is return bent as indicated at 46 and in the return bent portion, there is secured the angle member 48 having the outstanding flange 50 reinforced by the flange 52 on the edge of the return bent portion 46. The shank 44 passes through the return bent portion as well as the angle member 48 and all the parts are rigidly held together by means of the nut 42 and shank 44.

When the operator desires to inspect the engine, he releases the usual hood catch 54, seizes the handle 40 and raises the hood. After being raised through a given distance, the flange 50 will strike against the angularly bent member 32 of the bracket 24. When this point in the operation has been reached, the hood subsections 34 and 36 of the side portion 16 will be in the position shown in Figure 2. In this interrelation of the subsections 34 and 36, the hinge 38 will be on the far side of the hinge 18 or over the unraised hood portion 14. This will throw the center of gravity over the hood section 14 on one side of the hinge 18. The weight of the portion 16 will therefore still further tend to move the hood section 16 to collapsed position over the section 14. This further movement will be prevented by the engagement of the flange 50 with the angularly bent end 32 as shown in Figure 4. The parts will be retained in this position until the operator seizes the handle 40 and returns the hood to the lowered position.

I claim:

1. In a means for retaining the hood of a vehicle in raised position, comprising a plurality of rods extending beneath the hood, a bracket on each rod, and means operative on the raising of the hood to engage the brackets to retain the hood in raised position.

2. In a means for retaining the hood of a vehicle in raised position, comprising a plurality of rods extending beneath the hood, a bracket on each rod, an angular end on said bracket, and means on the hood to engage the angular end to retain the hood in raised position.

3. In a means for retaining the hood of a vehicle in raised position, comprising a plurality of rods extending beneath the hood, a bracket on each rod, an angular end on said bracket, and a flange on said hood to engage the angular end to retain the hood in raised position.

4. In a means to retain the hood of a vehicle in raised position, comprising a brace rod beneath the hood, a bracket on the rod, and means on the lower portion of the hood engaging the bracket on the upward movement of the hood to retain said hood in raised position.

5. In a means for retaining the hinged hood of a vehicle in raised position, said hood having a plurality of articulated sections, comprising a brace rod beneath the hood, a bracket on the rod, and means on the lower portion of the hood to strike and engage the bracket on the upward movement of the hood, said hood in its raised position having its center of gravity on that side of the hinge which is away from the hood in its down position.

6. In a means for retaining the hood of a vehicle in raised position, said vehicle having an engine and a radiator, means to brace the radiator, and means on the lower portion of the hood to engage the brace means on the upward movement of the hood to retain the hood in raised position and restrain it from further upward movement.

In testimony whereof I affix my signature.

EDWARD T. RAGSDALE.